(12) United States Patent
Kurosaki et al.

(10) Patent No.: US 8,059,251 B2
(45) Date of Patent: Nov. 15, 2011

(54) MULTILAYERED CELL, ELECTRONIC TERMINAL, AND METHOD OF FILLING MULTILAYERED CELL WITH MEDIA

(75) Inventors: Yoshihisa Kurosaki, Kawasaki (JP); Junji Tomita, Kawasaki (JP); Toshiaki Yoshihara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 694 days.

(21) Appl. No.: 12/184,548

(22) Filed: Aug. 1, 2008

(65) Prior Publication Data

US 2008/0316417 A1  Dec. 25, 2008

Related U.S. Application Data

(63) Continuation of application No. PCT/JP2006/301885, filed on Feb. 3, 2006.

(51) Int. Cl.
*G02F 1/1339* (2006.01)
*G02F 1/1341* (2006.01)
*G02F 1/1347* (2006.01)

(52) U.S. Cl. ............... 349/154; 349/74; 349/189

(58) Field of Classification Search .......... 349/153, 349/189–190, 74
See application file for complete search history.

(56) References Cited

U.S. PATENT DOCUMENTS

| | | | |
|---|---|---|---|
| 5,796,447 A * | 8/1998 | Okumura et al. .......... 349/33 |
| 6,750,928 B2 | 6/2004 | Hiji et al. | |
| 6,809,788 B2 | 10/2004 | Yamada et al. | |
| 2003/0235722 A1 | 12/2003 | Blanckaert et al. | |

FOREIGN PATENT DOCUMENTS

| | | |
|---|---|---|
| JP | 2002-116461 A | 4/2002 |
| JP | 2002-287157 A | 10/2002 |
| JP | 2003-161960 A | 6/2003 |
| JP | 2003-222843 A | 8/2003 |
| JP | 2004-29786 A | 1/2004 |
| TW | 200628874 B | 8/2006 |

OTHER PUBLICATIONS

International Search Report of PCT/JP2006/301885, date of mailing Apr. 18, 2006.
Taiwanese Office Action dated Jul. 1, 2010, issued in corresponding Taiwanese Patent Application No. 095103738.

* cited by examiner

*Primary Examiner* — James Dudek
(74) *Attorney, Agent, or Firm* — Westerman, Hattori, Daniels & Adrian, LLP

(57) ABSTRACT

A method of filling a multilayered cell with media. In the method, a multilayered cell having at least two layers, i.e., a first and second layer, is filled with media. The method comprises forming in the first layer a first medium injection region for filling the first layer with a first medium, forming in the second layer a second medium injection region for filling the second layer with a second medium, the second medium injection region corresponding to a region different from the first medium injection region, superposing the first and second layers, forming within the first medium injection region a first through-hole extending through the multilayered cell in the layer-thickness direction, forming within the second medium injection region a second through-hole extending through the multilayered cell in the layer-thickness direction, and injecting the first and second media into the first and second through-holes, respectively, to fill the first and second layers with the first and second media. Thus, a multilayered cell can be easily produced in a shorter time while attaining a reduction in deterioration during production.

16 Claims, 13 Drawing Sheets

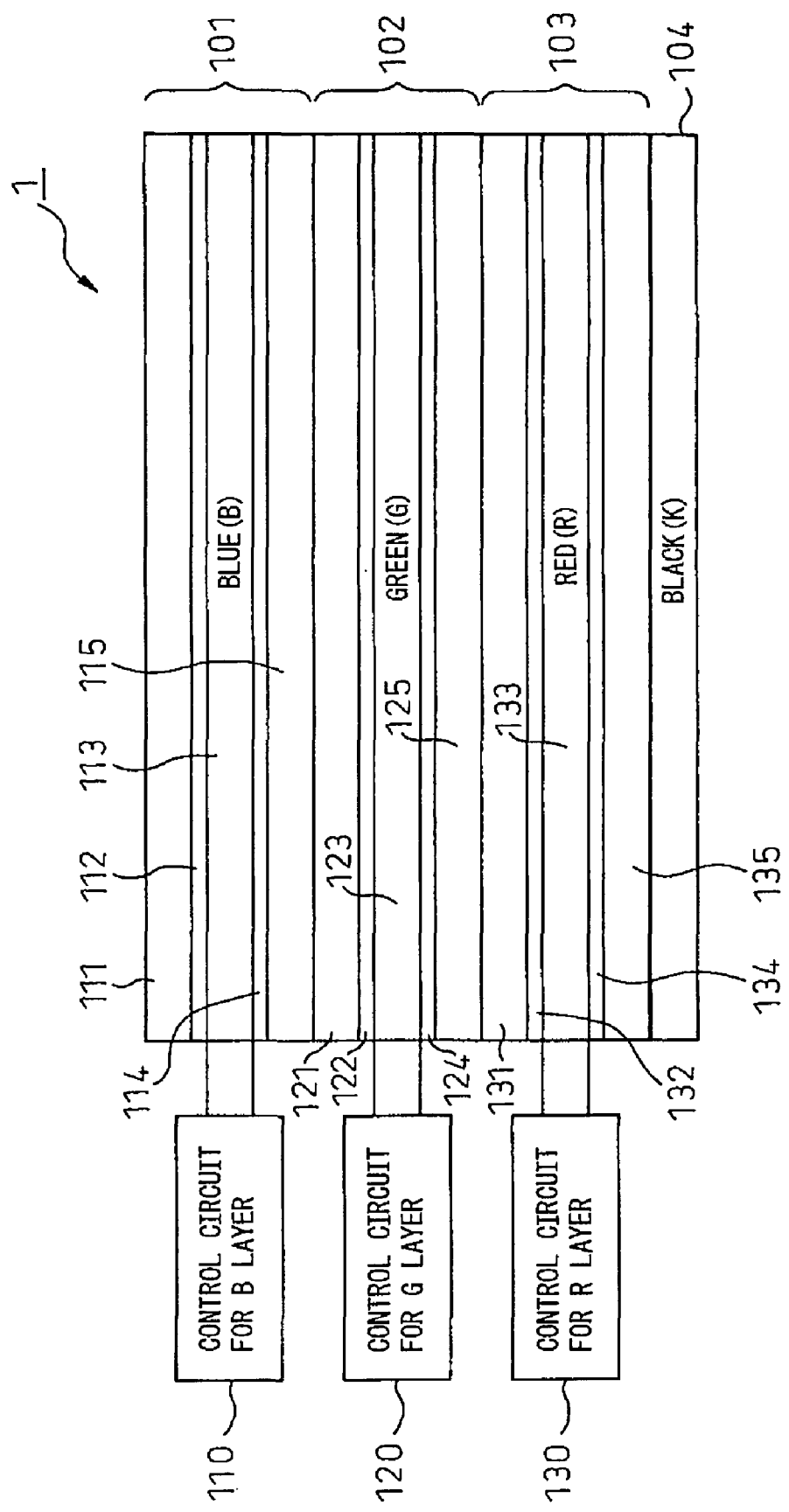

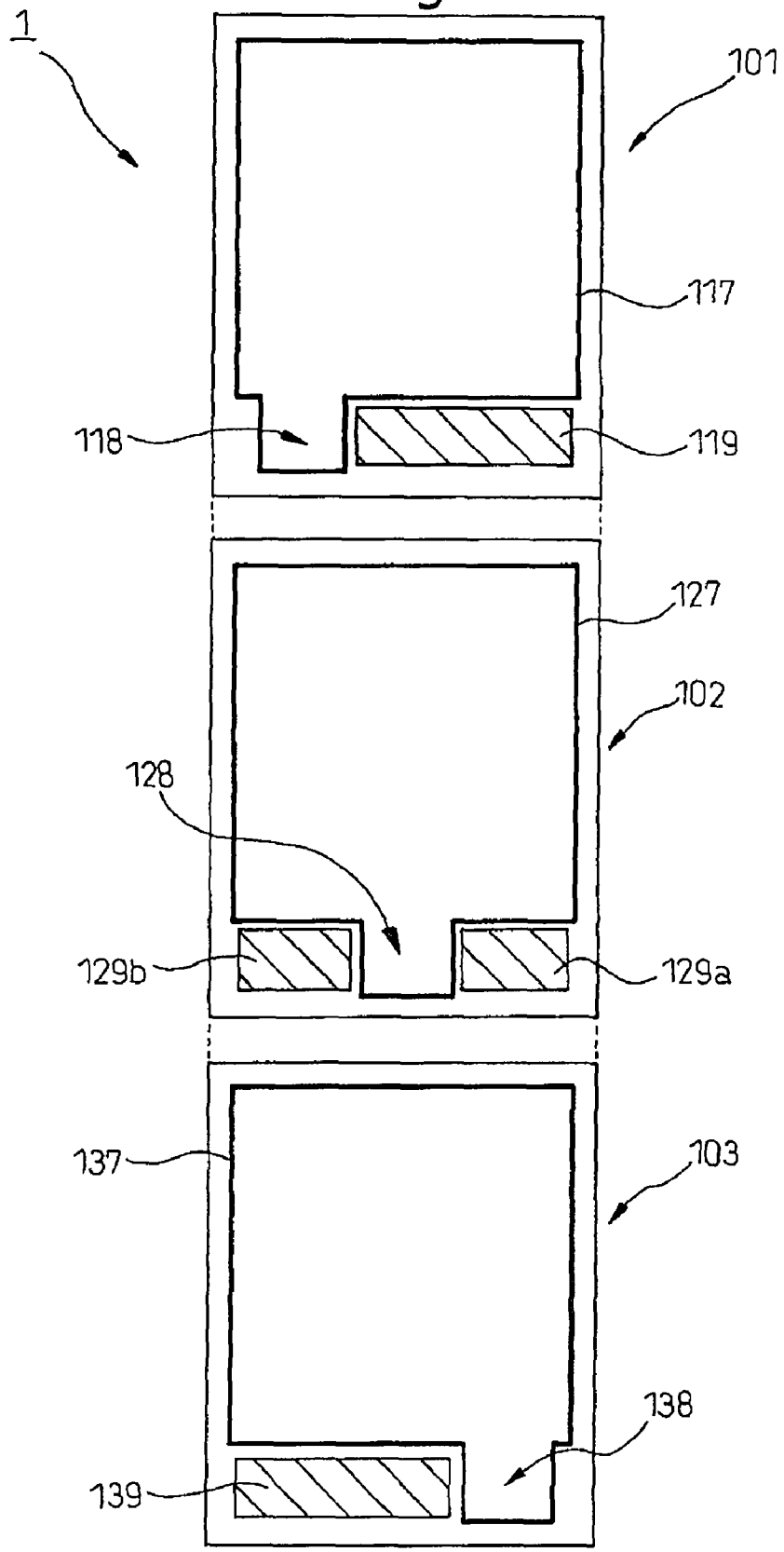

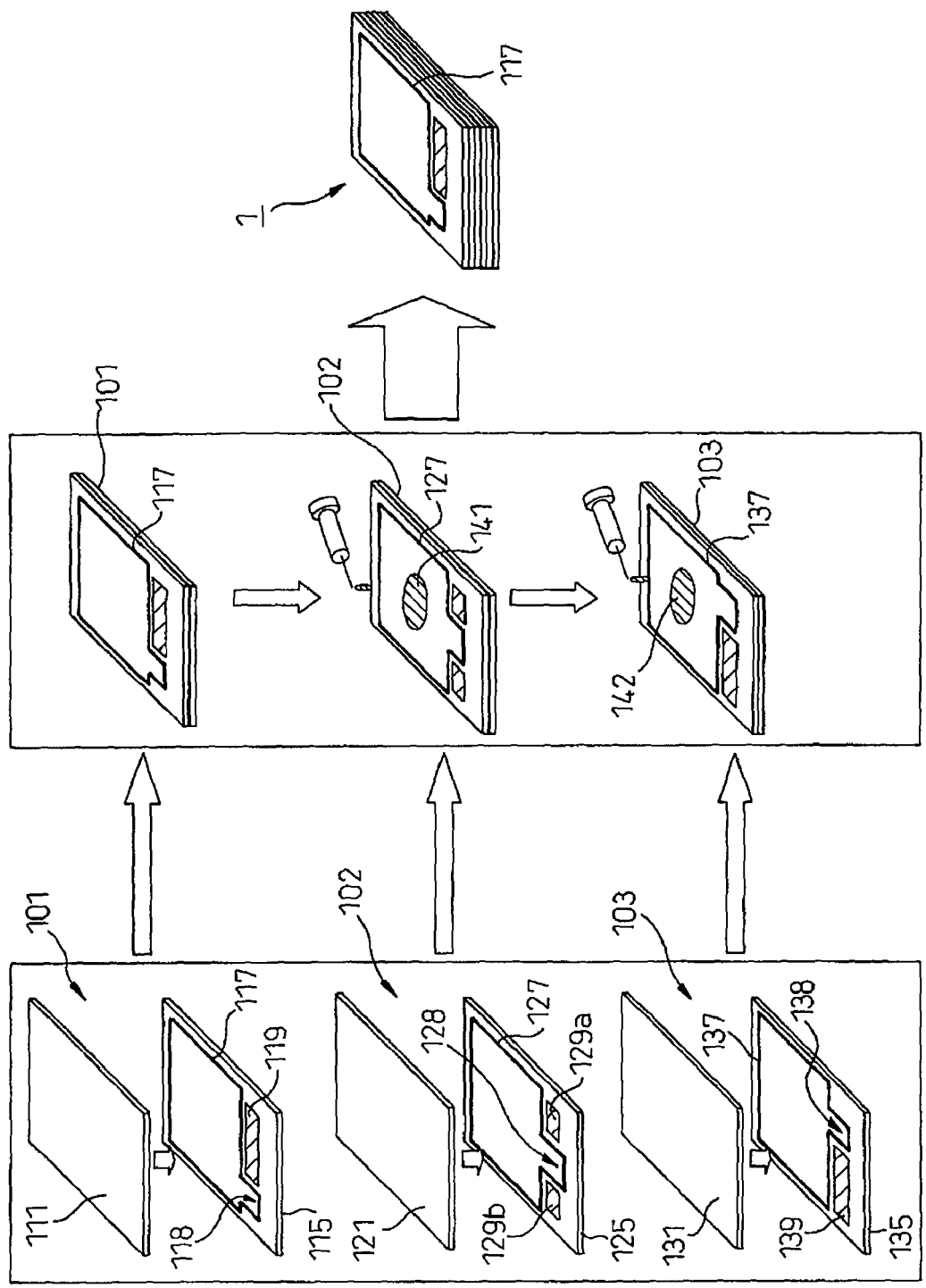

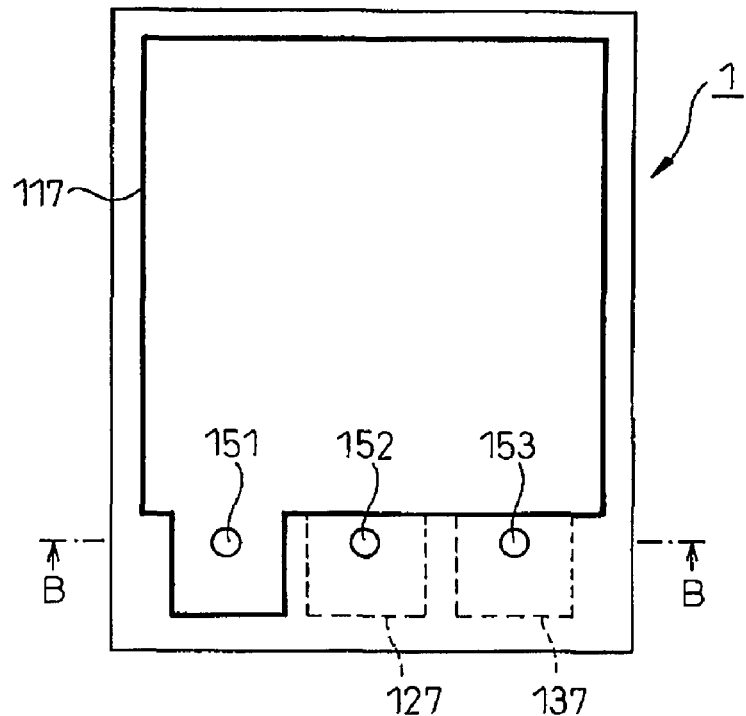
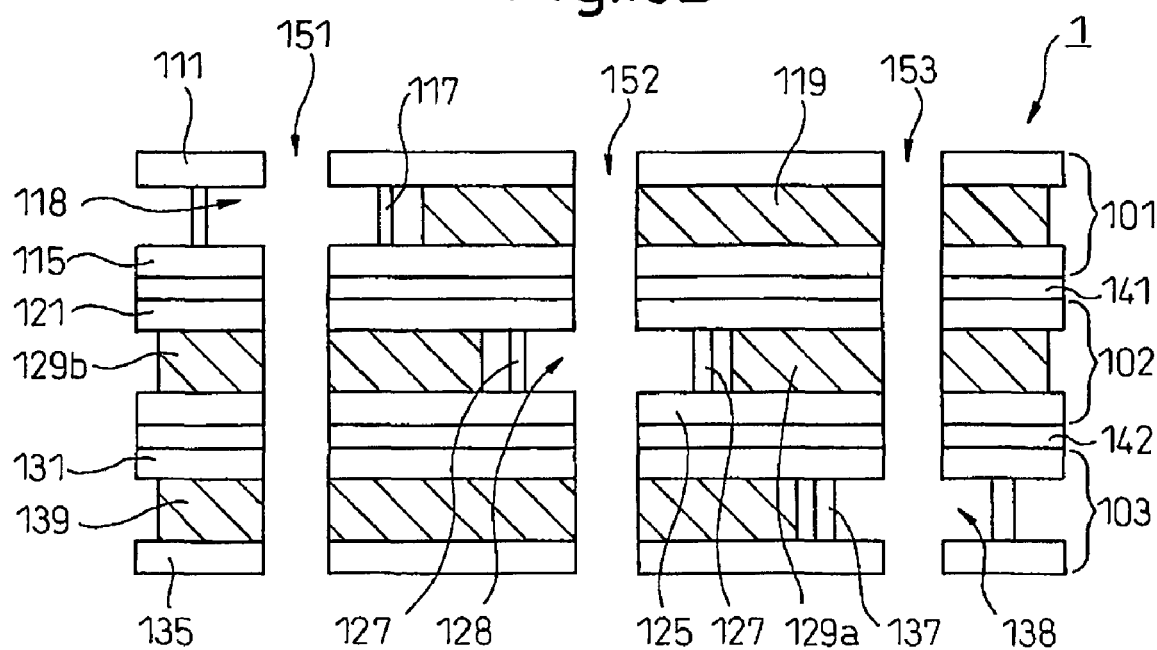

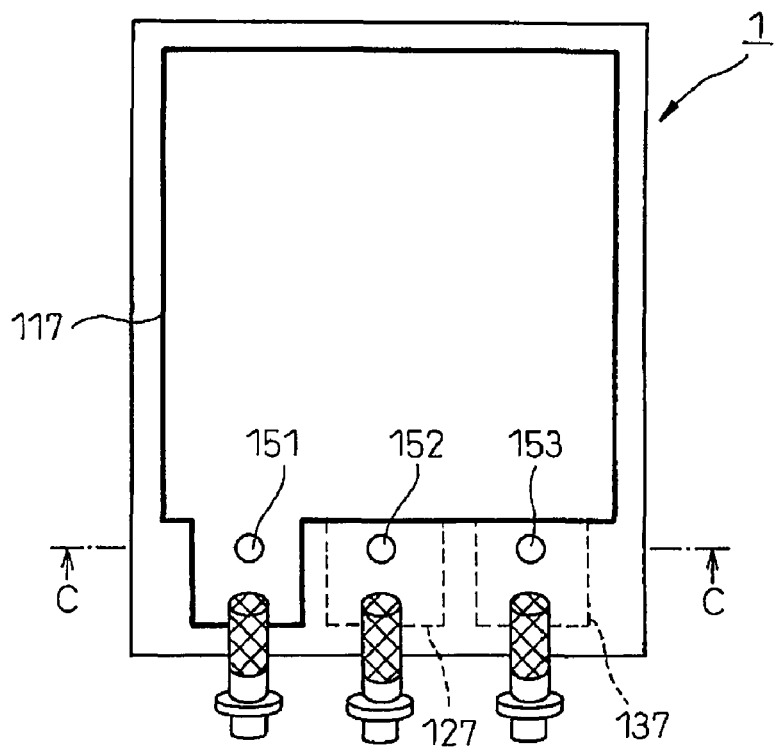
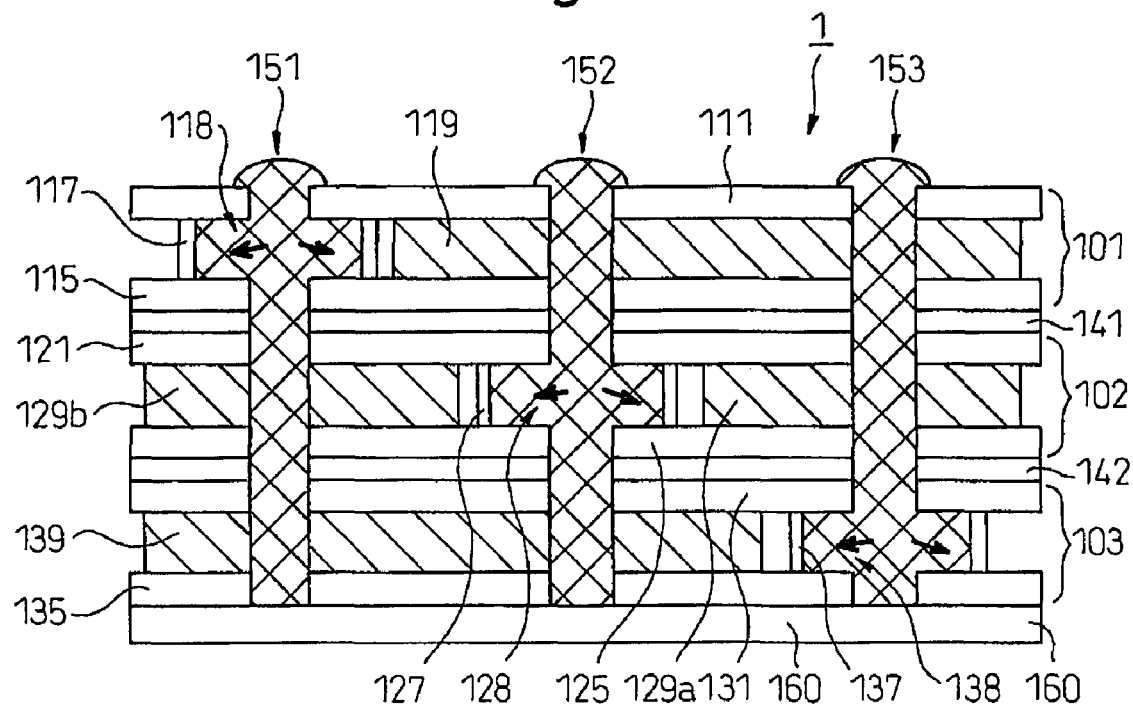

MULTILAYERED CELL, ELECTRONIC TERMINAL, AND METHOD OF FILLING MULTILAYERED CELL WITH MEDIA

CROSS-REFERENCE TO RELATED APPLICATION

This application is a continuation application and is based upon PCT/JP2006/301885, filed on Feb. 3, 2006.

BACKGROUND

The embodiment relates to a multilayered cell, to an electronic terminal, and to a method of filling a multilayered cell with media.

In recent years, a technology has been rapidly developing in the field of electronic papers, wherein a displayed image on an electronic paper can be retained indefinitely without a power source and can be rewritten electrically. The technology of electronic papers aims to realize a display which is thin and flexible like a paper and which is of extremely low power consumption permitting an image to remain displayed as memory even when a power source is disconnected, and which provides an eye-friendly reflective display that is not wearisome to eyes.

The technology of electronic paper is now being actively developed in various corporations and research institutions such as universities. As promising application markets for electronic paper, various applications are proposed such as e-books (electronic books), electronic newspapers, electronic posters, as well as sub-displays of mobile terminals and displays for IC cards.

As a method for displaying on an electronic paper, various methods are contemplated and being actively developed, including, for example, an electrophoretic method in which charged particles are moved in air or in a liquid, a twist ball display method in which charged particles divided in two colors are rotated, a method using a bistable and selectively reflective cholesteric liquid crystal which permits interference reflection from liquid crystal layers, and the like.

Among these methods, the method using a cholesteric liquid crystal is overwhelmingly advantageous for color display in that, in methods other than by using a cholesteric liquid crystal, color filters need to be provided to divide each pixel into three colors so that brightness is reduced to at most ⅓ of the incident light, making these methods impractical. On the contrary, in the method using a cholesteric liquid crystal, since color is produced by interference of reflection from liquid crystal layers, color display is made possible simply by laminating the liquid crystal layers and is advantageous in that brightness of approximately 50% of the incident light can be achieved.

The cholesteric liquid crystal which is considered to be promising material as an electronic paper has excellent characteristics such as semi-permanent display image retaining capability (memory capability), a clear color display, high contrast and high resolution image, etc., and enables clear full color display to be realized by laminating three display layers R (red), G (green), and B (blue), reflecting red, green, and blue colors, respectively Since a cholesteric liquid crystal material is a liquid crystal having the property of a memory, and can be driven in an inexpensive and simple matrix drive mode, it is relatively easy to realize, for example, a large display of A4 size or larger. Further, with the cholesteric liquid crystal, only the renewal of the content of display (rewriting an image) needs electric power, and once the image has been rewritten, the image is retained even when the electric power source is entirely turned off.

In this specification, an electronic paper having multilayered configuration consisting of three layers (R, G, and B layers) of cholesteric liquid crystal material is mainly described as an example which enables full-color display. However, a multilayered cell (display device) according to the embodiment is not limited to such an electronic paper, but can be applied more widely to, for example, a multilayered cell composed of a plurality of layers (that is, two or more layers) having respective media filled therein, such as an electrochemical photo-cell, and the like.

First, an example of driving method for cholesteric liquid crystal is described as an example of display device to which the embodiment can be applied.

FIG. 1A and FIG. 1B are views useful for explaining orientation states of a cholesteric liquid crystal, wherein FIG. 1A shows a planar state and FIG. 1B shows a focal conic state.

When no electric field is applied, cholesteric liquid crystal can take one of two stable states, that is, planar state and focal conic state.

Thus, as shown in FIG. 1A, in a planar state, incident light is reflected from the liquid crystal so that reflected light can be seen with human eyes.

As shown in FIG. 1B, in a focal conic state, incident light passes through the liquid crystal, and therefore, by providing a light absorption layer separate from the liquid crystal layer, black color can be displayed in focal conic state.

Here, in planar state, light having wavelength corresponding to the spiral pitch of the liquid crystal molecules is reflected. The wavelength $\lambda$ for which maximum reflection is obtained can be expressed as $\lambda = n \cdot p$, where n is mean refractive index, and p is the spiral pitch. Reflection bandwidth $\Delta\lambda$ increases with refractive index anisotropy $\Delta n$ of the liquid crystal.

FIG. 2A, FIG. 2B, and FIG. 2C are views showing voltage characteristics (relation of voltage and time) for driving the cholesteric liquid crystal, showing electric field applied to the liquid crystal for respective variations of homeotropic state, focal conic state, and planar state. Here, symbols H, FC, and P represent homeotropic state, focal conic state, and planar state, respectively.

When a strong electric field is applied to the cholesteric liquid crystal, the spiral structure of the liquid crystal molecules is completely loosened, and the transition to homeotropic state H in which all the molecules are aligned with the electric field occurs.

As shown in FIG. 2B, when the electric field is suddenly reduced to zero from the homeotropic state, the spiral axis of the liquid crystal becomes perpendicular to the electrode, and the transition to planar state P occurs in which light is selectively reflected in accordance with the spiral pitch.

On the other hand, when a weak electric field in which spiral axis of the liquid crystal molecules is barely loosened is formed and then reduced to zero, as shown in FIG. 2A, or when a strong electric field is first applied and is slowly reduced to zero, as shown in FIG. 2C, the spiral axis of the liquid crystal becomes parallel to the electrode, and the transition to the focal conic state FC occurs in which incident light is transmitted through the liquid crystal.

When electric field of an intermediate strength is applied to the liquid crystal and is suddenly removed, liquid crystals in planar state P and in focal conic state FC exist in a mixture, permitting a display in an intermediate tone.

Thus, cholesteric liquid crystal is bistable, and this phenomenon can be used to display information.

FIG. 3 is a view showing reflectivity characteristics (relation of reflectivity to voltage) of the cholesteric liquid crystal, which summarizes the voltage response of the cholesteric liquid crystal described above with reference to FIGS. 2A to 2C.

As shown in FIG. 3, if the initial state is planar state P (the high reflectivity region at the left end of FIG. 3), when the pulse voltage is raised to a certain range, the transition to the drive band of focal conic state FC (the low reflectivity region of FIG. 3) occurs, and when the pulse voltage is raised further, the transition back to the drive band of planar state P (the high reflectivity region at the right end of FIG. 3) occurs.

If the initial state is focal conic state FC (the low reflectivity region at the left end of FIG. 3), as the pulse voltage is raised, gradual transition to the drive band of planar state P occurs.

In planar state P, only right hand circularly polarized light or left hand circularly polarized light is reflected and the rest of the light is transmitted, so that theoretical maximum reflectivity is 50%.

FIG. 4 is a block diagram schematically showing an example of an electronic terminal (display apparatus) having a display device applied thereto. In FIG. 4, reference numeral 1 denotes a display device (multilayered cell), 3 denotes a power supply circuit, 4 denotes a control circuit, 21 denotes a driver IC on the scanning side (scan driver), and 22 denotes a driver IC on the data side (data driver).

As shown in FIG. 4, the power supply 3 comprises a voltage step-up section 31, a voltage generating section 32 and a regulator 33. The voltage step-up section 31 receives an input voltage of about +3 to +5V from a battery, and raised it to a voltage suitable for driving a display device 1, and supplies it to the voltage generating section 32. The voltage generating section 32 generates voltages required for the scan driver 21 and for the data driver 22, respectively. The regulator 33 regulates and stabilizes the voltages from the voltage generating section 32 and supplies them to the scan driver 21 and for the data driver 22.

The control circuit 4 comprises an operational section 41, a control signal generating section 42 and an image data generating section 43. The operational section 41 performs operation on the externally supplied image data and control signal to transmit the image data via the image data generating section 43 as data suitable for the display device 1 to the data driver 22, and the control signal via the control signal generating section 42 as various control signals suitable for the display device 1 to the scan driver 21 and the data driver 22.

Here, the control signals transmitted from the control signal generating section 42 to the scan driver 21 and the data driver 22 includes, for example, a pulse polarity control signal CS2 for inversion control of the polarity of pulse voltage imparted to the display device 1, a frame start signal CS3 for indicating the start of an image of 1 frame, a data latch scan shift signal CS4 for controlling data for a line to be stored by the data driver 22 in synchronism with a line selected by the scan driver 21, a driver output shutoff signal CS5 for shutting off driver output from the data driver 22 and the scan driver 21, and the like. Further, a data acquisition clock CS1 for successively acquiring data for 1 line is also supplied from the control signal generating section 42 to the data driver 22.

FIG. 5 is a sectional view schematically showing a part of the display device (liquid crystal display device: multilayered cell) shown in FIG. 4, that is, showing a layer (individual layer R, G, B). In FIG. 5, reference numerals 11 and 15 denote substrates (film substrates), 12 and 14 denote transparent electrodes (for example, ITO), and 13 denotes a liquid crystal composition (cholesteric liquid crystal), 16 denotes a driver circuit, and 17 denotes a sealant.

The display device 1 comprises the liquid crystal composition 13, and on the inner surfaces of the transparent substrates 11 and 15 (surfaces between which the liquid crystal composition is encapsulated), a plurality of transparent electrodes 12 and 14 are formed so as to intersect each other orthogonally. That is, on the opposing substrates 11 and 15, a plurality of scan electrodes 12 and a plurality of data electrodes 14 are formed in the shape of a matrix. It is to be understood that, in FIG. 5, the scan electrodes 12 and the data electrodes 14 are depicted as seemingly parallel to each other, but that, in practice, a plurality of data electrodes 14 intersect any one of the scan electrodes 12. Thickness of each substrate 11 and 15 is, for example, about 0.2 mm, and thickness of the layer of the liquid crystal composition 13 is, for example, about 3 μm to 60 μm, although, in the Figure, proportion of the thickness is ignored for simplicity of explanation.

Here, coatings of an insulating thin film and an orientation stabilizing film are preferably formed on each of the electrodes 12 and 14. Further, a light absorption layer for absorbing visible light is provided as required on the bottom (back surface) of the substrate (12) that is opposite to the light incident side of the lowermost layer (for example, R layer). The liquid crystal composition 13 is, for example, cholesteric liquid crystal that exhibits a cholesteric phase at room temperature.

The sealant 17 is the material for encapsulating the liquid crystal composition 13 between the substrates 11 and 15. The driver circuit 16 is provided in order to apply a predetermined pulse voltage between the electrodes 12 and 14.

The substrates 11 and 15 may be exemplified, for example, by glass substrates. Other material than the glass substrates, for example, flexible resin film substrates such as PET, PC, etc., may also be used. As the electrodes 12 and 14, ITO (Indium Tin Oxide) is typically used. However, other material, for example, transparent conductive film such as IZO (Indium Zinc Oxide), or metal electrodes such as aluminium, or silicon, or amorphous silicon, or photoconductive film such as BSO (Bismuth Silicon Oxide) or the like, may also be used.

In the liquid crystal display device shown in FIG. 5, a plurality of mutually parallel and transparent strip electrodes 12 and 14 are formed on the inner surfaces of the transparent film substrates 11 and 15, and these electrodes 12 and 14 are opposed to each other so as to intersect each other as seen in the direction perpendicular to the substrates.

Here, the display device may have an insulating thin film formed thereon which has functions of preventing short circuit between electrodes or improving reliability of the liquid crystal display device as a gas barrier layer. As an orientation stabilizing film, an organic film such as polyimide resin, polyamide-imide resin, polyether-imide resin, polyvinyl butylal resin, acryl resin, or the like, or inorganic material such as silicon oxide, aluminium oxide, or the like, may be used. The orientation stabilizing film coated on the electrode 12 and 14 may be used also as an insulating thin film.

The liquid crystal display device may have spacers provided between a pair of substrates for maintaining uniform gap between the substrates. As spacers, spheres of resins or inorganic oxides may be used, for example. Adhesive spacers having thermoplastic resin coated on the surface thereof may be used advantageously.

The multilayered cell of the embodiment is not limited to the liquid crystal display cell having liquid crystal layers such as R, G, and B layers. The embodiment may be widely applied to a multilayered cell such as an electrochemical photocell composed by filling a plurality of layers with respective media. It is to be understood that the multilayered cell can be applied in various fields such as electronic papers for e-books, electronic terminals such as mobile terminals as described above, and the like.

FIG. 6 is a view showing an example of multilayered cell (display device). In FIG. 6, reference numeral 101 denotes a blue (B) layer for reflecting blue light, 102 denotes a green (G) layer for reflecting green light, 103 denotes a red (R) layer for reflecting red light, and 104 denotes a black (K) layer for absorbing light.

As shown in FIG. 6, the display device 1 has a laminated structure having R layer 103, G layer 102, and B layer 101 laminated in this order on K layer 104. B layer 101 is composed of liquid crystal 113 sandwiched by opposing substrates (film substrates) and transparent electrodes 111, 112, and 115, 114. G layer 102 is composed of liquid crystal 123 sandwiched by opposing substrates (film substrates) and transparent electrodes 121, 122, and 125, 124. R layer 103 is composed of liquid crystal 133 sandwiched by opposing substrates (film substrates) and transparent electrodes 131, 132, and 135, 134. Lamination in the order of B layer 101, G layer 102, and R layer 103 as seen from the side of incident light is intended, for example, to obtain a wide view angle as well as to obtain suitable color display by reflection from respective layers. Other order of layer arrangement may be employed.

The transparent electrodes 112 and 114 for B layer 101 are connected to a control circuit 110 for controlling B layer, and the transparent electrodes 122 and 124 for G layer 102 are connected to a control circuit 210 for controlling G layer, and transparent electrodes 132 and 134 for R layer 103 are connected to a control circuit 310 for controlling R layer. Here, the transparent electrodes 112, 114; 122, 124; 132, 134 for each layer comprise scan electrodes and data electrodes, respectively, which are opposed to and intersect each other. In each of the layers 101 to 103, a scan driver is connected to the scan electrodes and a data driver is connected to the data electrodes. With the construction as described above, the display device 1 is capable of displaying nearly in full color.

In the foregoing, the display device is composed of a QVGA of A6 size, and the order of laminating B layer 101, G layer 102, and R layer 103, the direction of polarization of light in the liquid crystal, and the drivers used, and the like, are the same as in the QVGA display device of A4 size described above with reference to FIG. 5. In FIG. 6, the control circuits (scan drivers) 130 to 110 for each of R, G, and B layers are provided separately. By using a common scan driver (130 to 110) for each of R, G, and B layers, cost saving is possible.

Conventionally, Various multilayered cells (liquid crystal optical modulation devices) have been proposed for color display using cholesteric liquid crystal, and a liquid crystal optical modulation device which is bright and exhibits good contrast and color purity, and has an excellent bistable characteristics has been proposed (see, for example, JP-2002-116461-A).

Also, in prior art, a liquid crystal display panel has been proposed which permits liquid crystal to be injected completely in a short time and in which at least one injection port is formed through the substrate for evacuating the inner space and for injecting the liquid crystal, and after the liquid crystal has been injected into the liquid crystal display panel which has a protruding part enclosing the injection port, the protruding part including the injection port which become unnecessary thereafter is separated and removed (see, for example, JP-2002-287157-A).

Further, in prior art, a manufacturing method for laminated type liquid crystal display cell formed by laminating a plurality of liquid crystal display cells each with liquid crystal material encapsulated therein has been proposed, wherein, in order to satisfactorily suppress mixing of impurities into a prescribed liquid crystal material in the individual liquid crystal display cells, and to make a cell gap of each liquid crystal display cell to reach a target value, each peripheral part of a pair of substrates opposed to each other is sealed except for at least one liquid crystal injection port communicating with an external part, and then, a laminated type hollow cell is formed by stacking a plurality of hollow cells, and liquid crystal material is filled into each hollow cell of the laminated type hollow cell through the liquid crystal injection port simultaneously or nearly simultaneously by vacuum injection (see, for example, JP-2003-161960-A).

Also, in prior art, in order to provide a multilayered cell such as a liquid crystal display cell or an electrochemical photo cell, etc., comprising a plurality of superposed substrates joined in pairs by a sealed frame, a multilayered cell has been proposed in which filling holes are provided so as to be at least partially disposed on the cell surface, each filling hole communicating with different space and passing through at least one space to reach a space wherein the holes are joined, filling holes being isolated from each other in the one or plural spaces where they pass through (see, for example, JP-2004-029786-A). The multilayered cell permits different liquids such as liquid crystal materials to be filled into each cell at the same time.

As has been described above, in recent years, an electronic paper using cholesteric liquid crystal or the like has been proposed, and an electronic paper having three layers, that is, R, G, and B layers, of cholesteric liquid crystal in a multilayered structure and permitting full color display is being developed for practical use.

Typically, in order to manufacture a laminated type liquid crystal color display device (multilayered cell), conventionally, R, G, and B panels are individually manufactured, and thereafter, R, G, and B panels are joined and laminated by means of adhesive or the like.

In the process for laminating these panels, conventionally, heat or light, for example, needs to be applied to the panels in order to harden the adhesive and to join and fix these panels to each other. This process may adversely affect individual members used in the panels, especially the liquid crystal, and may become an important factor for deteriorating the characteristics of the liquid crystal.

Further, when overheating of the panel is required in the lamination process, expansion of the volume of the liquid crystal in each panel (cell) or the like may cause the sealing portion to leak, or may damage the panels, resulting in lowering of the yield.

It is preferable, in order not to lower the efficiency for manufacturing a multilayered cell (display device), that filling of liquid crystal into each of R, G, and B layers can be carried out simultaneously.

SUMMARY

According to an aspect of an embodiment, there is provided a multilayered cell having at least a first layer and a second layer, wherein the first layer has a first medium injection region for filling the first layer with a first medium; and the second layer has a second medium injection region for filling the second layer with a second medium, the second medium injection region corresponding to a region different from the first medium injection region, and wherein the multilayered cell comprises: a first through-hole extending through the multilayered cell in a layer-thickness direction within the first medium injection region for filling the first medium only into the first layer; and a second through-hole extending through the multilayered cell in the layer-thickness direction within the second medium injection region for filling the second medium only into the second layer.

BRIEF DESCRIPTION OF THE DRAWINGS

FIG. 6 is a view showing an example of multilayered cell;

FIG. 7 is a view schematically showing an example of each cell comprising a multilayered cell according to the embodiment;

FIG. 8 is a view useful for explaining a preliminary step in a method of filling a multilayered cell with media according to the embodiment;

FIG. 10A is a plan view showing the multilayered cell shown in FIG. 9A and FIG. 9B having through-holes for injecting media formed therein;

FIG. 10B is a sectional view taken along the line B-B of the multilayered cell shown in FIG. 10A;

FIG. 11A is a plan view showing the multilayered cell shown in FIG. 10A and FIG. 10B having media filled into therein;

FIG. 11B is a sectional view taken along the line C-C of the multilayered cell shown in FIG. 11A;

DETAILED DESCRIPTION OF THE EMBODIMENTS

Figure 1A:
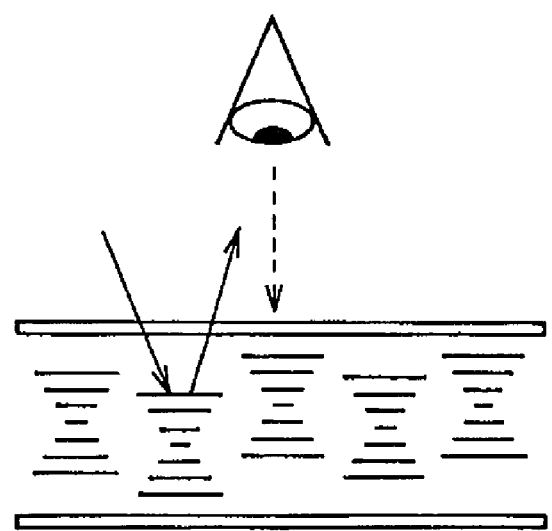
FIG. 1A is a view (part 1) useful for explaining an orientation state of cholesteric liquid crystal.
Figure 1B:
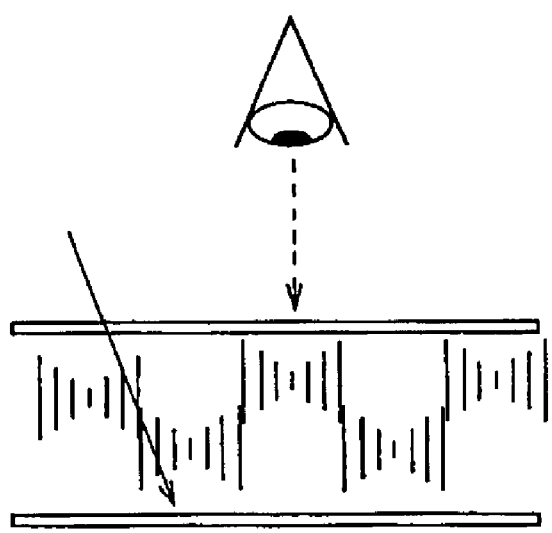
FIG. 1B is a view (part 2) useful for explaining an orientation state of cholesteric liquid crystal.
Figure 2A:
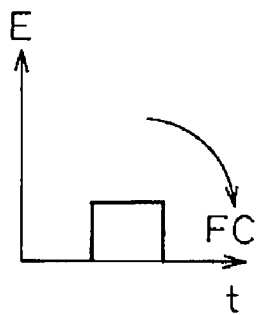
FIG. 2A is a view (part 1) showing a voltage characteristics for driving cholesteric liquid crystal.
Figure 2B:
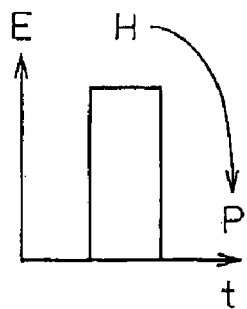
FIG. 2B is a view (part 2) showing a voltage characteristics for driving cholesteric liquid crystal.
Figure 2C:
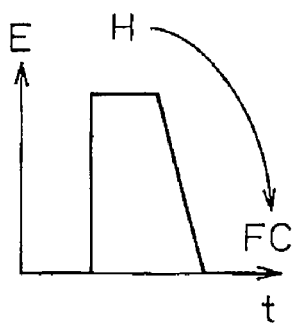
FIG. 2C is a view (part 3) showing a voltage characteristics for driving cholesteric liquid crystal.
Figure 3:
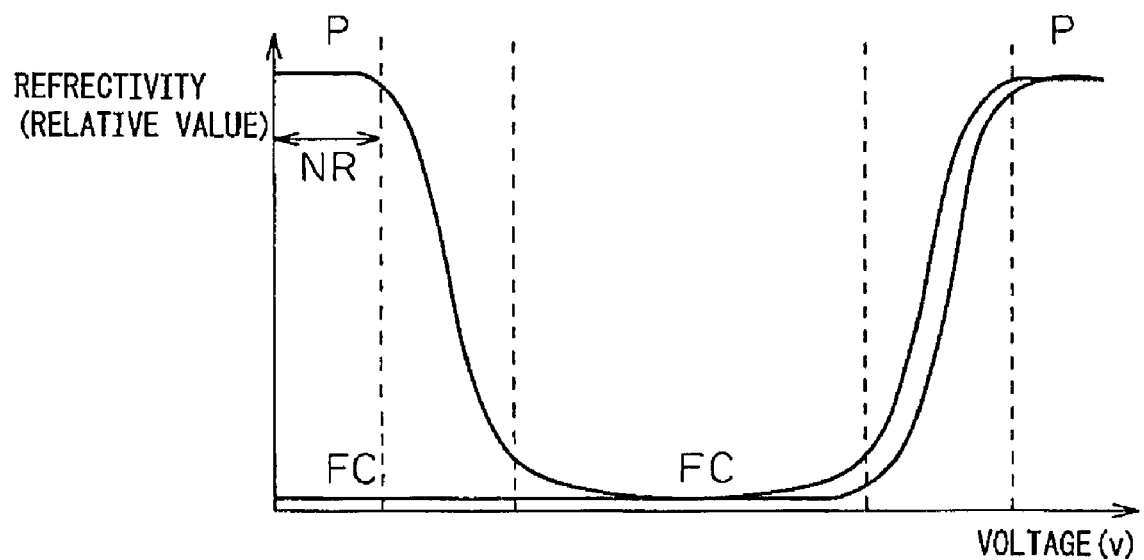
FIG. 3 is a view showing reflectivity characteristics of cholesteric liquid crystal.
Figure 4:
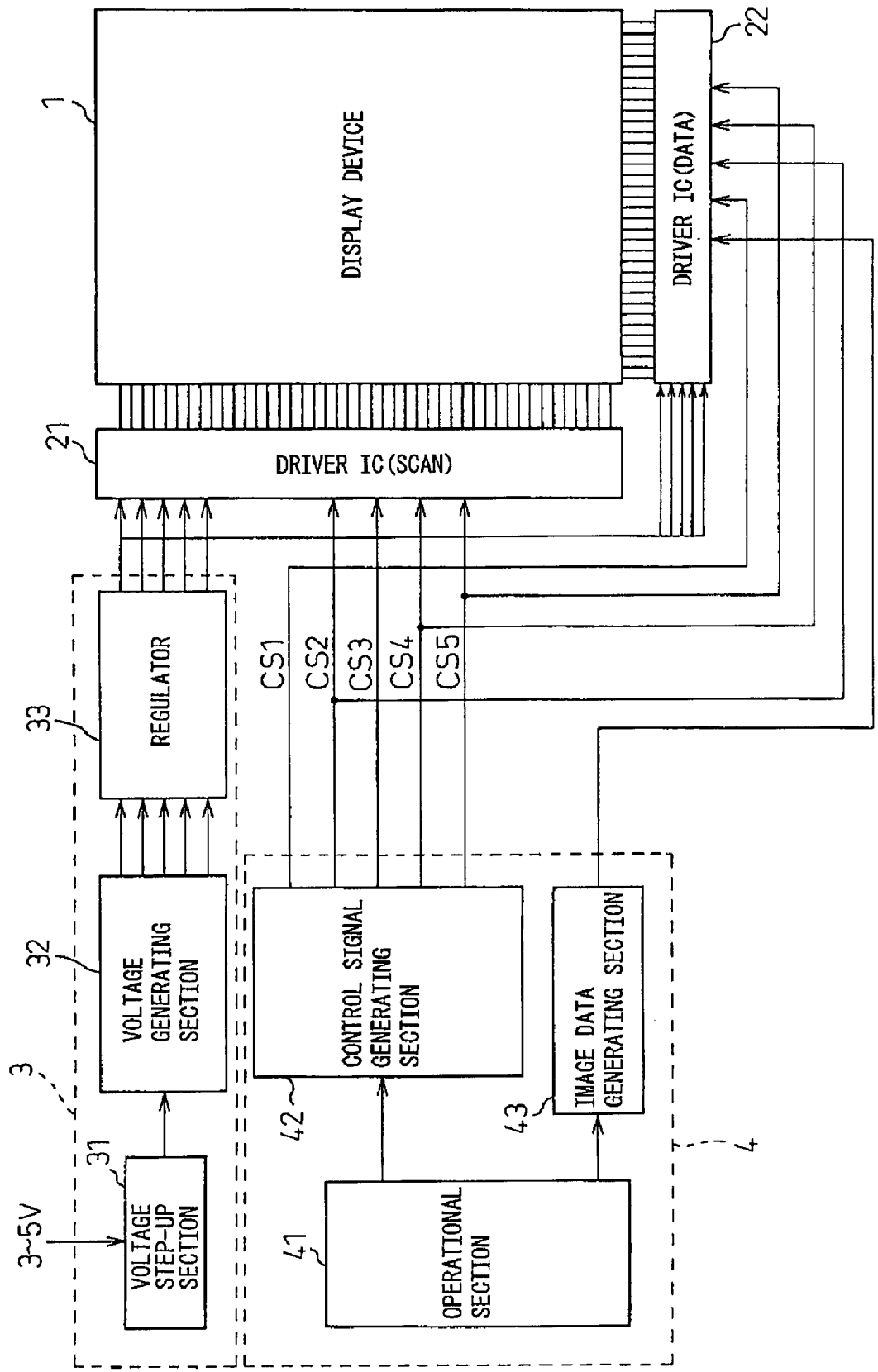
FIG. 4 is a block diagram schematically showing an example of electronic terminal having the display device applied thereto.
Figure 5:
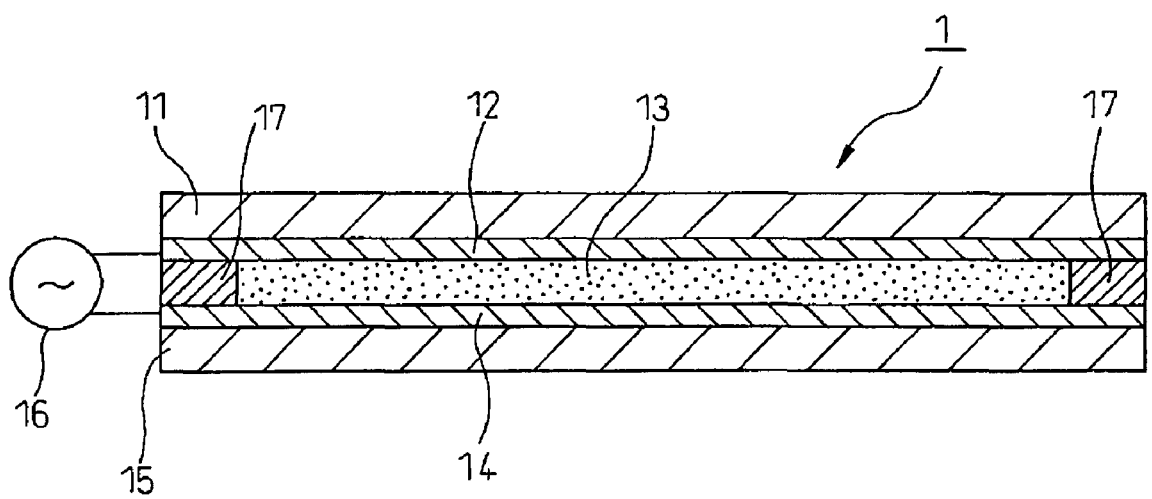
FIG. 5 is a sectional view schematically showing a portion of the display device shown in FIG. 4.

Before describing examples of the embodiment in detail, a method of filling a multilayered cell with media according to the embodiment will be outlined. In the following description, a liquid crystal display cell having liquid crystal filled into three layered cell, i.e., R, G, B layers representing three primary colors is illustrated as an example. However, the embodiment can also be applied more widely to various multilayered cells, for example, to an electrochemical photocell or the like, having a plurality of layers filled with different media.

First, a sealant (17, 117, 127) is applied to one of two substrates used for each cell, and an adhesive (barrier 119; 129a, 129b; 139) is thickly applied around the liquid crystal injection region (118, 128, 138).

Then, spacers are scattered on either the substrate having the sealant applied thereto or the other substrate, and after two substrates have been attached to each other to form a cell, three layers are laminated by using an adhesive (see FIG. 8).

Further, after laminating three layers, through-holes (151, 152, 153) are provided in the liquid crystal injection regions (118, 128, 138) for each layer (see FIG. 10A and FIG. 10B).

Figure 12:
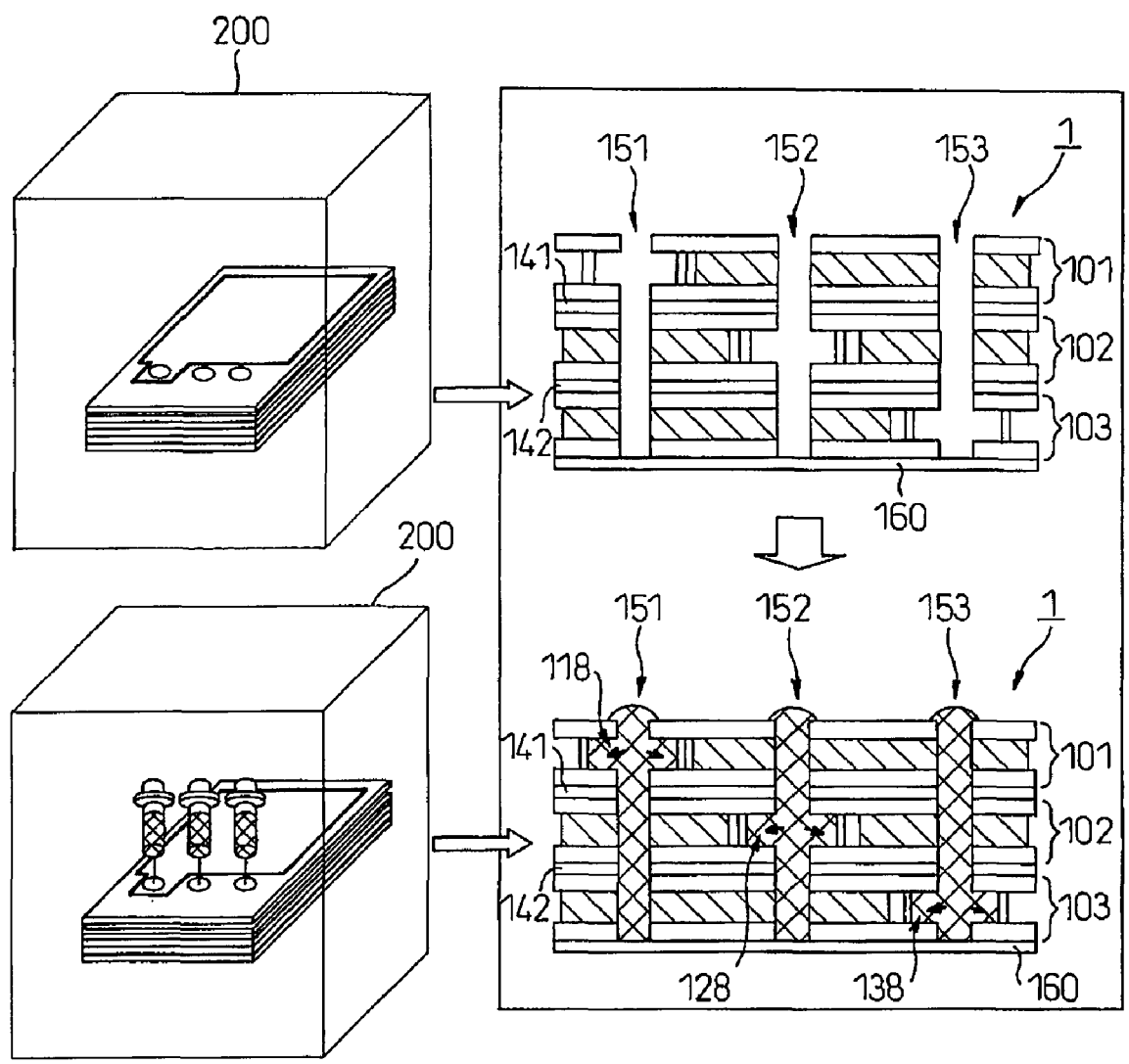
FIG. 12 is a view useful for explaining an example of injection step for injecting media in the method of filling the multilayered cell with media according to the embodiment.

Then, for example, the empty cell after lamination is placed into a vacuum chamber, and after evacuating the chamber, while maintaining the chamber under vacuum, desired liquid crystal to be filled into R, G, or B layer is injected into through-holes (151, 152, 153), respectively (see FIG. 12).

Then, upon releasing the chamber from vacuum, the liquid crystal materials for R, G, B layers are filled into corresponding cell, respectively.

Here, the three layers of empty cell can be laminated into one unit, and a plurality of units can be stacked so that injection of liquid crystal may be performed simultaneously to a plurality of units.

Below, an embodiment of a multilayered cell and a method of filling the multilayered cell with media according to the embodiment will be described in detail with reference to appended drawings.

FIG. 7 is a view schematically showing an example of each cell composing a multilayered cell according to the embodiment, showing R, G, B layers individually. Here, the multilayered cell 1 shown in FIG. 7 corresponds to the multilayered cell (display device) described above with reference to FIG. 6.

Thus, the multilayered cell 1 is composed of lamination of B layer 101 reflecting blue light, G layer 102 reflecting green light, and R layer 103 reflecting red light, in this order from the top (from the plane of observation). Under the lowermost R layer 103, unshown K layer (104) absorbing light may be provided.

The sealant 117 for B layer 101 joins opposing substrates so as to provide a medium injection region 118 for injecting cholesteric liquid crystal for blue color (medium for blue color), and the sealant 127 for G layer 102 joins opposing substrates so as to provide a medium injection region 128 for injecting cholesteric liquid crystal for green color (medium for green color), and the sealant 137 for R layer 103 joins opposing substrates so as to provide a medium injection region 138 for injecting cholesteric liquid crystal for red color (medium for red color).

As shown in FIG. 7, the medium injection region 118 for blue color, the medium injection region 128 for green color, and the medium injection region 138 for red color are arranged such that, when the three layers, that is, B layer 101, G layer 102 and R layer 103, are joined and fixed to each other, these regions are disposed at different positions.

When three layers are joined, the barrier (filler) 119 is provided in the B layer 101 at location corresponding to the medium injection region 128 for green color and the medium injection region 138 for red color, and the barriers 129a and 129b are provided in the G layer 102 at locations corresponding to the medium injection region 138 for red-green color and to the medium injection region 118 for blue color, and the barrier (filler) 139 is provided in the R layer 103 at location corresponding to the medium injection region 118 for blue color and the medium injection region 128 for green color, wherein barriers 119, 129a, 129b, 139 are filled between opposing substrates (111, 115, 121, 125, 131, 135) in each of B, G, R layers, and heat curable resin or UV curable resin may be used.

FIG. 8 is a view useful for explaining a preliminary step of a method of filling a multilayered cell with media according to the embodiment.

First, as shown in the left of FIG. 8, B layer 101, G layer 102, and R layer 103 are respectively assembled by using sealant 117, 127, and 137 and barriers 119, 129a, 129b, and 139 of heat curable resin or the like. Positional relation between the medium injection regions 118; 128; 138 and barriers 119; 129a, 129b; 139 is as described above with reference to FIG. 7.

Here, if application of heat or UV irradiation is required for hardening of the sealant 117, 127, 137 and the barriers 119; 129a, 129b; 139, the application of heat or UV irradiation is performed before injection of media (liquid crystal) into respective layers.

Next, as shown in the center figure of FIG. 8, B layer 101, G layer 102, and R layer 103, which are empty with respective media not yet injected, are joined using adhesive 141, 142 to form a multilayered cell as shown in the right of FIG. 8. At this time, color material such as G-cut filter for attenuating specific color (for example, green) may be applied between layers.

Again, if application of heat or UV irradiation is required for hardening the adhesive 140 to reinforce the joint between layers 101, 102, and 103, such application of heat or UV irradiation is performed before injection of media (liquid crystal) into respective layers.

When, for example, a light absorption layer is provided under R layer 103 as described above, an adhesive or the like is used at this stage to join and fix the light absorption layer. In this manner, a multilayered cell is formed before media are injected (filled) into respective layers.

Figure 9A:
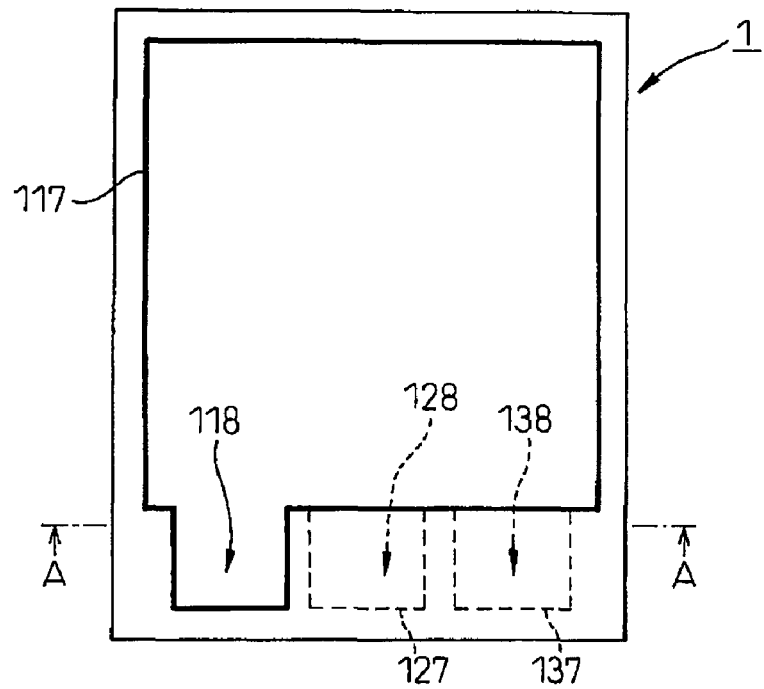
FIG. 9A is a plan view showing a multilayered cell formed by the preliminary step of FIG. 8.
Figure 9B:
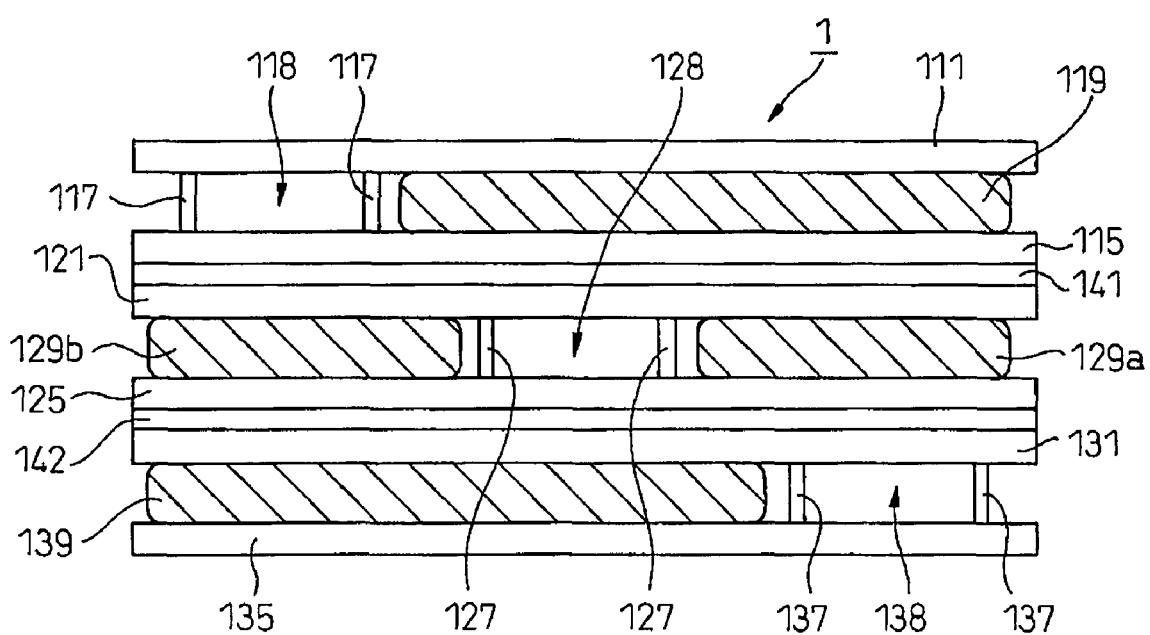
FIG. 9B is a sectional view taken along the line A-A of the multilayered cell shown in FIG. 9A.

FIG. 9A is a plan view showing a multilayered cell formed by the preliminary step of FIG. 8, and FIG. 9B is a sectional view taken along the line A-A of the multilayered cell shown in FIG. 8.

As is evident from FIG. 9A and FIG. 9B, when B layer 101, G layer 102, and R layer 103 are joined and fixed by adhesive 141, 142, the barrier 119 is present at locations in B layer 101 corresponding to the medium injection region 128 for green color and the medium injection region 138 for red color, the barriers 129a and 129b are present at locations in G layer 102 corresponding to the medium injection region 138 for red-green color and the medium injection region 118 for blue color, and the barrier 139 is present at locations in R layer 103 corresponding to the medium injection region 118 for blue color and the medium injection region 128 for green color.

FIG. 10A is a plan view showing through-holes formed for injecting media into the multilayered cell shown in FIG. 9A and FIG. 9B, and FIG. 10B is a sectional view taken along the line B-B of the multilayered cell shown in FIG. 10A. FIG. 11A is a plan view showing the multilayered cell shown in FIG. 10A and FIG. 10B having media injected therein, and FIG. 11B is a sectional view taken along the line C-C of the multilayered cell shown in FIG. 11A.

As shown in FIG. 10A and FIG. 10B, a through-hole 151 for blue color extending through three layers, i.e., B, G, R layers 101, 102, 103 is formed in the medium injection region 118 for blue color in B layer 101. As shown in FIG. 11A and FIG. 11B, the through-hole 151 for blue color is formed such that, when a medium for blue color (cholesteric liquid crystal for blue color) is injected via the through-hole 151 for blue color into B layer 101, the medium for blue color is injected only into B layer 101, and injection of the medium for blue color into other layers, i.e., G layer 102 and R layer 103, is inhibited by the barriers 129b and 139.

Similarly, a through-hole 152 for green color extending through three layers is formed in the medium injection region 128 for green color in G layer 102. The through-hole 152 for green color is formed such that, when a medium for green color (cholesteric liquid crystal for green color) is injected via the through-hole 152 for green color into G layer 102, the medium for green color is injected only into G layer 102, and injection of the medium for green color into other layers, i.e., B layer 101 and R layer 103, is inhibited by the barriers 139 and 119.

Further, a through-hole 153 for red color extending through three layers is formed in the medium injection region 138 for red color in R layer 103. The through-hole 153 for red color is formed such that, when a medium for red color (cholesteric liquid crystal for red color) is injected via the through-hole 153 for red color into R layer 103, the medium for red color is injected only into R layer 103, and injection of the medium for red color into other layers, i.e., B layer 101 and G layer 102, is inhibited by the barriers 119 and 129a.

Injection (filling) of the media for blue color, for green color and for red color into B layer 101, G layer 102, and R layer 103 can be carried out simultaneously. Injection of each medium into corresponding through-hole is carried out with a shield member 160 such as silicone rubber, or the like, disposed under the lower substrate 135 of the lowermost layer, i.e., R layer 101.

FIG. 12 is a view useful for explaining an example of medium injection step in the method of filling a multilayered cell with media according to the embodiment. In FIG. 12, reference numeral 200 denotes a vacuum chamber, and the multilayered cell in the upper right portion of the figure corresponds to that shown in FIG. 10A and FIG. 10B, and the multilayered cell in the lower right portion of the figure corresponds to that shown in FIG. 11A and FIG. 11B.

As shown in the upper portion of FIG. 12, the multilayered cell (empty cell) 1 after lamination is placed in the vacuum chamber 200, and the chamber 200 is evacuated. Then, while maintaining the inside of the chamber 200 under vacuum, cholesteric liquid crystal for blue color, cholesteric liquid crystal for green color, and cholesteric liquid crystal for red color are injected (dropped) into the through-hole 151 for blue color, through-hole 152 for green color, and through-hole 153 for red color, respectively. Under the lowermost layer, i.e., R layer 101, a shield member 160 such as silicone rubber, for example, is disposed.

Then, as shown in the upper portion of FIG. 12, upon releasing the chamber from vacuum, the cholesteric liquid crystal materials for blue color, for green color, and for red color are filled into the space between the opposing substrates of B layer 101, G layer 102, and R layer 103.

Figure 13:
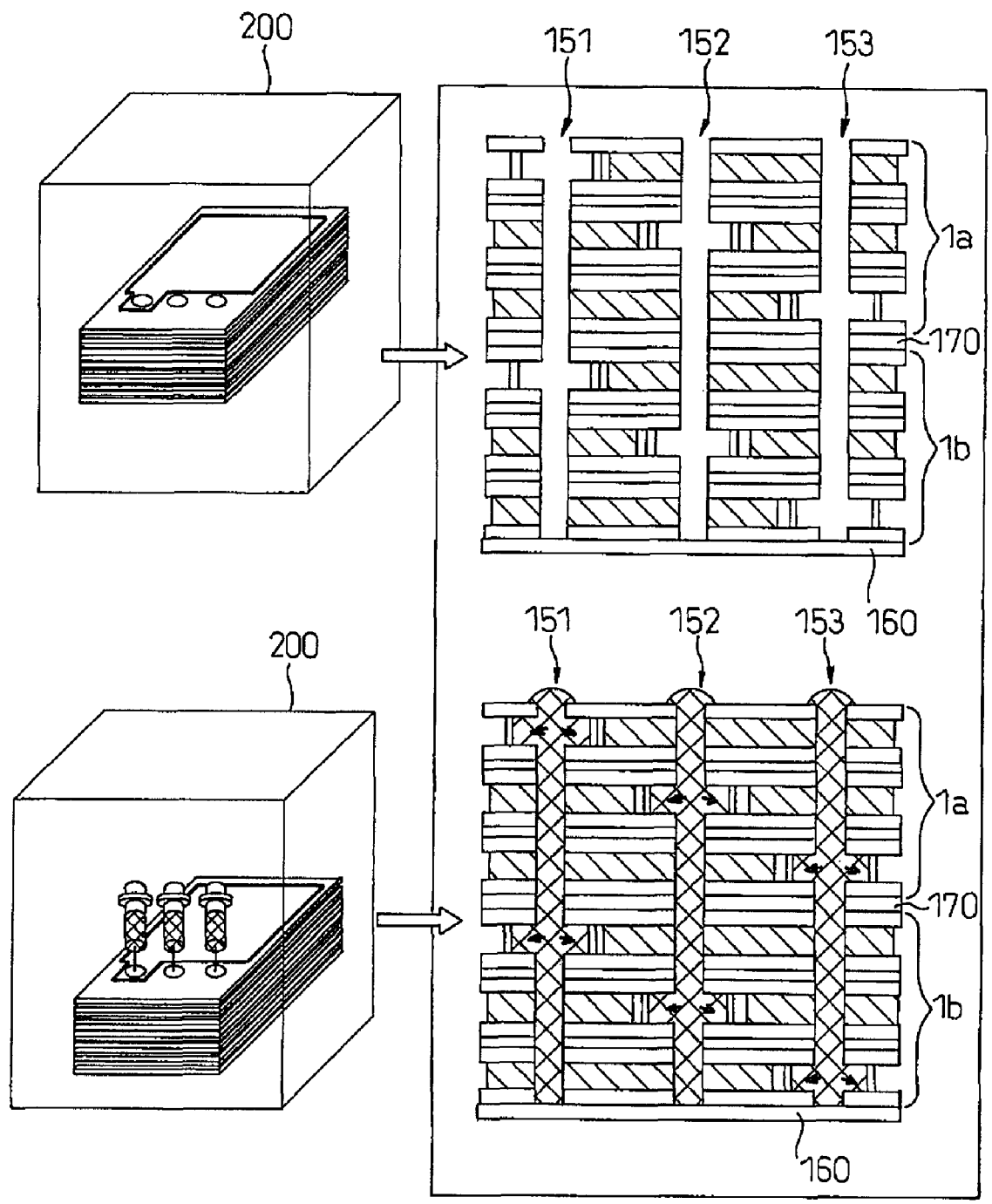
FIG. 13 is a view useful for explaining another example of injection step for injecting media in the method of filling the multilayered cell with media according to the embodiment.

FIG. 13 is a view useful for explaining another example of medium injection step in the method of filling a multilayered cell with media according to the embodiment.

As is evident from comparison of FIG. 13 with FIG. 12, in the method of filling a multilayered cell with media according to this Example, the multilayered cell shown in FIG. 12 is taken as a unit (multilayered cell unit), and two such multilayered cell units 1a and 1b are superposed one upon the other with a cohesion member 170 such as silicone rubber sandwiched therebetween, such that media can be injected simultaneously into the multilayered cell units 1a and 1b.

Here, as is evident from FIG. 13, holes are provided in the cohesion member 170 at positions corresponding to the through-holes 151, 152, and 153. It is to be understood that number of superposed multilayered cell units is not limited to two.

Thus, in accordance with the method of filling a multilayered cell with media according to the embodiment, liquid crystal cells are laminated before being filled with media, and thereafter, respective liquid crystals are filled into individual cells. Therefore, deterioration of liquid crystal, for example, due to application of heat or UV irradiation for hardening an adhesive can be eliminated. Also, in accordance with the method of filling a multilayered cell with media according to the embodiment, respective liquid crystals can be filled into individual cells without coming into contact and to be mixed with each other, so that a multilayered cell can be easily manufactured in short time, and the amount of liquid crystal lost at the time of filling can be reduced. Further, filling of liquid crystal into a plurality of multilayered cells (a plurality of multilayered cell units) cam be carried out simultaneously, so that multilayered cells can be manufactured more easily and in shorter time.

What is claimed is:

1. A multilayered cell having at least a first layer and a second layer, wherein
    said first layer has a first medium injection region for filling the first layer with a first medium; and
    said second layer has a second medium injection region for filling the second layer with a second medium, said second medium injection region corresponding to a region different from said first medium injection region, and wherein
    said multilayered cell comprises:
        a first through-hole extending through said multilayered cell to a bottom thereof in a layer-thickness direction within said first medium injection region for filling said first medium only into said first layer; and
        a second through-hole extending through said multilayered cell to the bottom thereof in the layer-thickness direction within said second medium injection region for filling said second medium only into said second layer.

2. The multilayered cell as claimed in claim 1, wherein
    a first barrier is provided in said first layer at a location corresponding to said second medium injection region; and
    a second barrier is provided in said second layer at a location corresponding to said first medium injection region.

3. The multilayered cell as claimed in claim 1, wherein said multilayered cell further comprises:
    a third layer having a third medium injection region for filling the third media, said third medium injection region corresponding to a region different from said first medium injection region and from said second medium injection region; and
    a third through-hole extending through said multilayered cell to the bottom thereof in the layer-thickness direction within said third medium injection region for filling said third medium only into said third layer.

4. The multilayered cell as claimed in claim 3, wherein
    first barriers are provided in said first layer at locations corresponding to said second and third medium injection regions; and
    second barriers are provided in said second layer at locations corresponding to said third and first medium injection regions, and third barriers are provided in said third layer at locations corresponding to said first and second medium injection regions.

5. The multilayered cell as claimed in claim 3, wherein
    said first, second and third layers are cholesteric liquid crystal layers which reflect blue color, green color, and red color, respectively; and
    said multilayered cell is a liquid crystal cell composing an electronic paper that permits full-color display.

6. An electronic terminal, wherein the multilayered cell as claimed in claim 1 is applied thereto.

7. A method of filling a multilayered cell with media, said multilayered cell having at least a first layer and a second layer, comprising:
    forming in said first layer a first medium injection region for filling the first layer with a first medium;
    forming in said second layer a second medium injection region for filling the second layer with a second medium, said second medium injection region corresponding to a region different from said first medium injection region;
    superposing said first and second layers;
    forming within said first medium injection region a first through-hole extending through said multilayered cell to a bottom thereof in a layer-thickness direction, and within said second medium injection region a second through-hole extending through said multilayered cell to the bottom thereof in the layer-thickness direction; and
    injecting said first and second media into said first and second through-holes, respectively, to fill said first and second layers with said first and second media.

8. The method of filling a multilayered cell with media as claimed in claim 7, further comprising:
    forming, when forming in said first layer said first medium injection region, a first barrier in said first layer at a location corresponding to said second medium injection region; and
    forming, when forming in said second layer said second medium injection region, a second barrier in said second layer at a location corresponding to said first medium injection region.

9. The method of filling a multilayered cell with media as claimed in claim 7, wherein
    when injecting said first and second media into said first and second through-holes, said injecting step is carried out with a shield member disposed under the lowermost layer.

10. The method of filling a multilayered cell with media as claimed in claim 9, wherein
    said first and second layers form a multilayered cell unit; and
    the multilayered cell units are laminated in the layer-thickness direction of said first and second layers such that a plurality of multilayered cell units may be processed simultaneously.

11. A method of filling a multilayered cell with media, said multilayered cell having at least a first layer, a second layer, and a third layer, comprising:
    forming in said first layer a first medium injection region for filling the first layer with a first medium;
    forming in said second layer a second medium injection region for filling the second layer with a second medium, said second medium injection region corresponding to a region different from said first medium injection region;
    forming in said third layer a third medium injection region for filling the third layer with a third medium, said third medium injection region corresponding to a region different from said first medium injection region;
    superposing said first, second, and third layers;
    forming within said first medium injection region a first through-hole extending through said multilayered cell to a bottom thereof in a layer-thickness direction, and within said second medium injection region a second through-hole extending through said multilayered cell to the bottom thereof in the layer-thickness direction, and within said third medium injection region a third through-hole extending through said multilayered cell to the bottom thereof in the layer-thickness direction; and said first, second, and third media are injected into said first, second, and third through-holes, and the first, second, and third media are filled into said first, second, and third layers.

12. The method of filling a multilayered cell with media as claimed in claim 11, further comprising:

forming, when forming in said first layer said first medium injection region, a first barrier in said first layer at locations corresponding to said second medium injection region and said third medium injection region;

forming, when forming in said second layer said second medium injection region, a second barrier in said second layer at locations corresponding to said third medium injection region and said first medium injection region; and forming, when forming in said third layer said third medium injection region, a third barrier in said third layer at locations corresponding to said first medium injection region and said second medium injection region.

13. The method of filling a multilayered cell with media as claimed in claim 11, wherein the media filled in said first, second, and third layers are cholesteric liquid crystal reflecting blue color, green color, and red color, respectively; and said multilayered cell is a liquid crystal cell composing an electronic paper permitting full color display.

14. The method of filling a multilayered cell with media as claimed in claim 11, wherein when said first, second, and third media are injected into said first, second, and third through-holes, said injecting step is carried out with a shield member disposed under the lowermost layer.

15. The method of filling a multilayered cell with media as claimed in claim 11, wherein said first, second, and third layers form a multilayered cell unit; and the multilayered cell units are laminated in the layer-thickness direction of said first, second, and third layers such that a plurality of multilayered cell units may be processed simultaneously.

16. The method of filling a multilayered cell with media as claimed in claim 15, wherein a cohesion member having said through-holes for first, second, and third layers formed therein is disposed between two adjoining multilayered cell units.

* * * * *